United States Patent
Yoshio

[11] Patent Number: 5,467,839
[45] Date of Patent: Nov. 21, 1995

[54] ALL TERRAIN VEHICLE

[75] Inventor: Oka Yoshio, Hermosa Beach, Calif.

[73] Assignee: Honda Giken Kogyo Kabushiki Kaisha, Tokyo, Japan

[21] Appl. No.: 791,046

[22] Filed: Nov. 12, 1991

Related U.S. Application Data

[63] Continuation of Ser. No. 27,718, Mar. 19, 1987, abandoned.

[51] Int. Cl.$^6$ .............................. B60K 17/34; B62K 5/00; B62K 11/04
[52] U.S. Cl. ............................................................ 180/233
[58] Field of Search .................................. 180/233, 234, 180/6.2, 311, 235

[56]          References Cited

U.S. PATENT DOCUMENTS

| | | | |
|---|---|---|---|
| 1,928,136 | 9/1933 | Rodgers | 180/233 X |
| 2,725,945 | 12/1955 | Beaudoux et al. | 180/244 X |
| 2,901,051 | 8/1959 | Thibodeau | 180/246 X |
| 3,828,876 | 8/1974 | Morelli | 180/89.1 X |
| 4,159,752 | 7/1979 | Kanno | 280/282 X |
| 4,233,857 | 11/1980 | Quick | 180/246 X |
| 4,493,385 | 1/1985 | Shiber | 180/6.2 |
| 4,516,654 | 5/1985 | Nishihara | 180/255 |
| 4,535,869 | 8/1985 | Tsutsumikoshi | 280/282 X |
| 4,614,249 | 9/1986 | Yamanaka | 180/233 X |
| 4,666,015 | 5/1987 | Matsuda et al. | 180/233 |
| 4,699,234 | 10/1987 | Shinozaki et al. | 180/233 |
| 4,770,262 | 9/1988 | Yasunaga et al. | 180/311 |

FOREIGN PATENT DOCUMENTS

| | | | |
|---|---|---|---|
| 502066 | 11/1954 | Italy | 180/246 |
| 234028 | 11/1985 | Japan | 180/235 |
| 668152 | 3/1952 | United Kingdom | 180/233 |
| 1088350 | 10/1967 | United Kingdom | 180/233 |

*Primary Examiner*—Mitchell J. Hill
*Attorney, Agent, or Firm*—Lyon & Lyon

[57]           ABSTRACT

A four-wheel all terrain vehicle having a centrally-mounted engine, straddle type seating and oversized balloon tires. The vehicle is arranged such that footpegs for the rider are located inwardly of the tires to avoid interference between either the footpegs or the rider's feet and the tires. The rear tires are positioned forwardly relative to the frame such that obstacles may be encountered by the rear tires prior to the obstacle coming to beneath the center of gravity of the vehicle. The footpegs are arranged at the center of gravity and approximately half way between a ground plane and the top of the seat for clearance and rider control. The tires are spaced apart approximately the same distance as the length of the radius of the tires to improve all terrain capability and allow access to the rider position. Centers for the wheels are arranged in a substantially square configuration and the vehicle swing arms are designed to have an effective length shorter than the associated tire radius.

6 Claims, 2 Drawing Sheets

ALL TERRAIN VEHICLE

This is a continuation, of application Ser. No. 027,718, filed Mar. 19, 1987 now abandoned.

BACKGROUND OF THE INVENTION

The field of the present invention is small, four-wheel, all terrain vehicles of the type having straddle seating and the overall arrangement thereof.

All terrain vehicles have been developed with straddle seating incorporating both two and four wheel drive. Such vehicles often employ a handlebar type steering mechanism to be gripped by the rider and footpegs extending laterally outwardly from the vehicle to accommodate the rider's feet. Depending on the complexity of the mechanism, suspension systems may be incorporated to provide a smoother ride.

In spite of the generic name for such vehicles employing large balloon tires as "all terrain vehicles" there necessarily are practical limits to the terrain which may be surmounted. With substantial irregularities, obstacles and the like found in the path of the vehicle, practical limits do exist for such vehicles. Other limits to the design of such vehicles also exist. For example, the size of the rider influences the location of handlebars, seats and footpegs.

SUMMARY OF THE INVENTION

The present invention is directed to an improved all terrain vehicle with enhanced abilities to surmount terrain and accommodate the rider. To this end, a number of aspects of the present invention are presented.

In a first aspect of the present invention, a straddle-type all terrain vehicle is contemplated where the track of the front and rear wheels and the positioning of laterally-extending footpegs is such that the distal ends of the footpegs are inwardly of the wheels and tires. This arrangement accommodates both the room necessary for large tires and the rider's feet. Independent location of the footpegs vis-a-vis the axles is then possible to best suit both the needs of the rider and the desired tire size.

In a further aspect of the present invention, the ability to overcome large obstacles such as logs and rocks is addressed. The rear tires are arranged relative to the frame and the remainder of the vehicle such that they extend into a specific volume which is defined as a cylinder having a lateral axis, a diameter equal to the distance between a level ground surface and the underside of the frame beneath the center of gravity and a location with the lateral axis beneath the center of gravity.

This arrangement is of particular advantage in that rounded objects which would otherwise hang up the vehicle between the front and rear wheels may be better overcome. Until the object reaches the center of gravity of the vehicle, the rear wheels retain some traction. If the object is large enough, the vehicle may otherwise then come to rest on the object without having the traction to proceed once the object reaches the center of gravity. By having the rear wheels extend into the defined volume, a greater probability exists that the rear wheels would not lose traction at that point but would gain traction on the object itself. As the vehicle progresses, the front wheels, which may also be driven, would also gain traction and the vehicle can continue.

In yet another aspect of the present invention, it has been found that easier and smoother operation over irregular ground may be accomplished by placing the footpegs at roughly the midpoint between a flat ground surface and the top of the driver's seat. The conventional placement of such footpegs is with the footpegs located approximately one-third of the distance from a flat ground plane to the top of the seat. In part this arrangement is even further enhanced through the employment of large tires such that the axles may also be roughly on the same horizontal plane as the footpegs.

Yet another aspect of the present invention is the compact distribution of the vehicle in a longitudinal direction. Central location of the engine with large tires provides added all terrain capability. If the front and rear tires define a longitudinal space therebetween which is less than the radius of the tires, greater ability to overcome large obstacles is realized. However, as the tires approach one another in design, it becomes more and more difficult for the rider to gain access to the seat and to have sufficient space for themselves. To this end, the present invention contemplates in this aspect an arrangement whereby the space between the tires is substantially equal to the radius of each tire. In this way, access to the rider position is accommodated while maximum all terrain capability is realized.

Another aspect of the present invention is to provide a vehicle with the centers of each of the wheels arranged such that the centers define a substantially square arrangement in plan. A wide, short wheel base has been found to enhance the ride when operated in water or mud. The short wheel base enhances all terrain capabilities and the substantially equal pitch and roll moment arms can enhance rider feel.

As a final aspect of the present invention, suspension swing arms may be employed to mount the wheels of the vehicle which are shorter than the radius of the tire or tires mounted thereby. This is made possible with larger tires because the tires themselves provide cushioning and damping and the suspension system may be simplified. Further, shorter swing arms allow for shorter wheel bases without compromising the frame size and room for the engine and the like. Finally, possible damage to the suspension system is reduced by the protection of the tires around the pivot axes.

Accordingly, it is an object of the present invention to provide an improved all terrain vehicle layout and design. Other and further objects and advantages will appear hereinafter.

DETAILED DESCRIPTION OF THE PREFERRED EMBODIMENT

Figure 1:
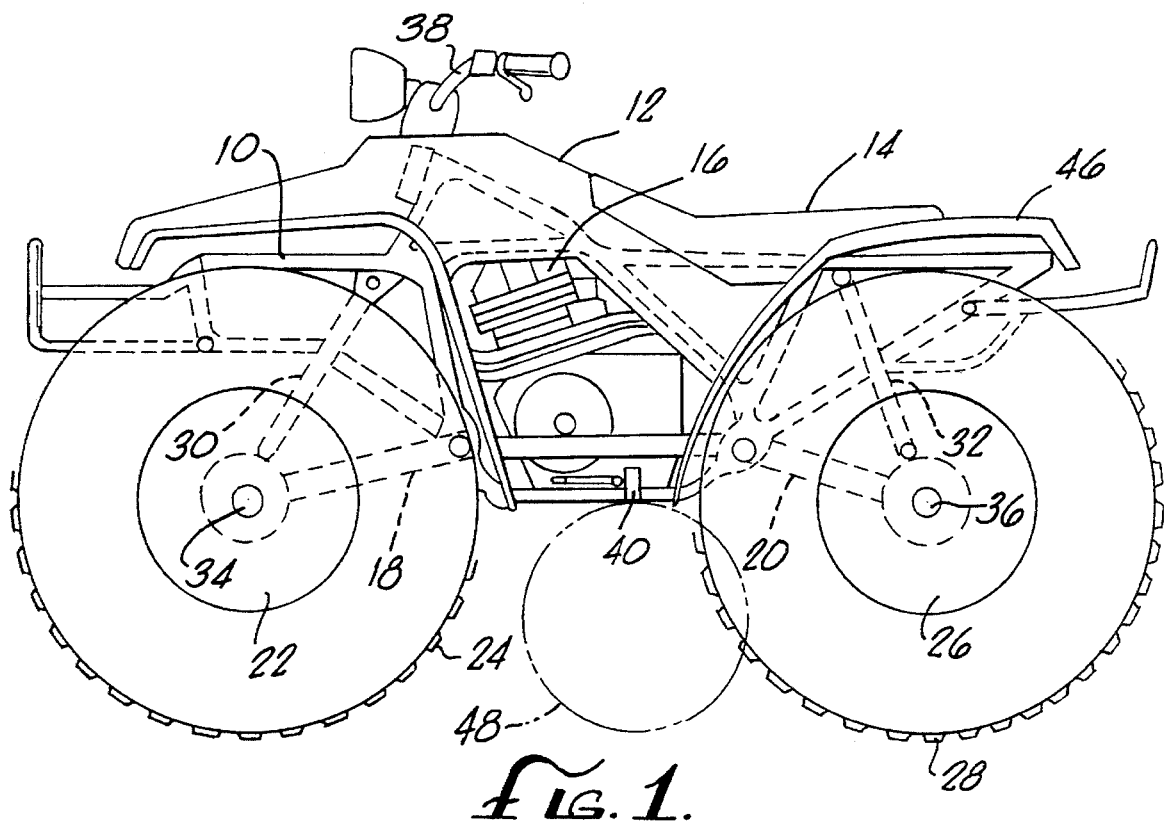
FIG. 1 is a side view of an all terrain vehicle of the present invention.
Figure 2:
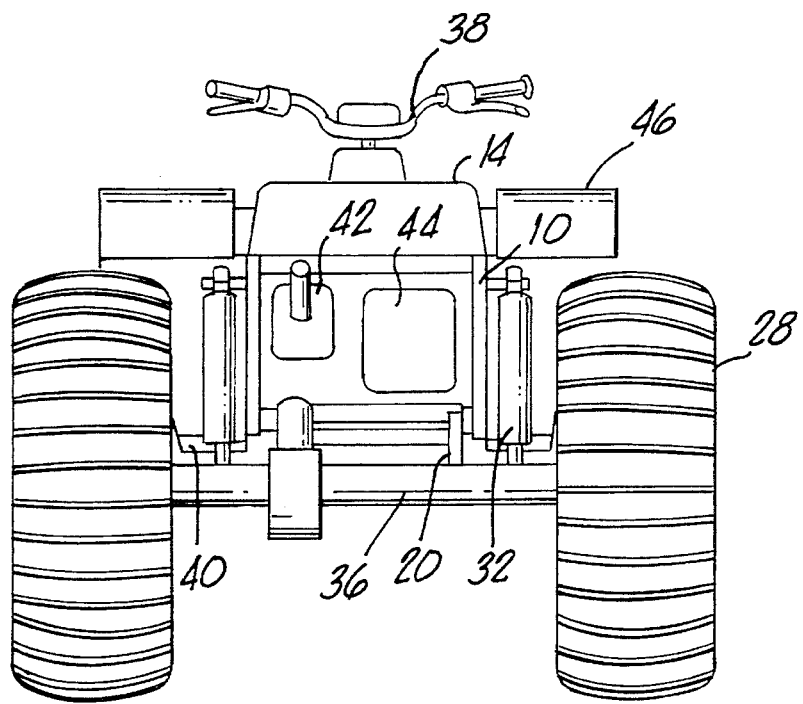
FIG. 2 is a rear view of the device of FIG. 1.

Turning in detail to the drawings, a four-wheel all terrain vehicle is illustrated. The all terrain vehicle includes a frame structure having a front, a rear and opposite sides 10 to which is mounted a body 12. The body 12 includes a seat 14 arranged for straddle seating for a rider. Within the frame 10 there is a power unit 16 which drives front and rear drive trains of well known construction operatively connecting between the power unit and front and rear wheels 22 and 26, respectively.

A front suspension system consisting of a front swing arm assembly 18 pivotally mounted to the front of the frame 10. A rear swing arm assembly 20 is similarly pivotally mounted to the rear portion of the frame 10. The front swing arm assembly 18 rotatably mounts wheels 22 each extending downward to provide support on the ground to lowermost extent on which are mounted large balloon tires 24 each extending downwardly to provide support on the ground to a lowermost extent. To the rear swing arm assembly 20 are mounted rear wheels 26 each extending inwardly to a second inner extent and balloon tires 28 each extending downwardly to provide support on the ground to a lowermost extent. The suspension assemblies include cushion members 30 and 32. Wheel axles 34 and 36 extend between the spaced front and rear wheels 22 and 26, respectively.

Other components associated with the vehicle include a handlebar assembly 38 for steering the front wheels. Footpegs 40 extend laterally outwardly from the frame 10 between the front and rear wheels. A muffler and exhaust system 42 is associated with the engine 16 and a fuel tank 44 is conveniently placed beneath the seat 14. Fenders 46 located on the body 12 protect the rider from splashed mud and the like.

Figure 3:
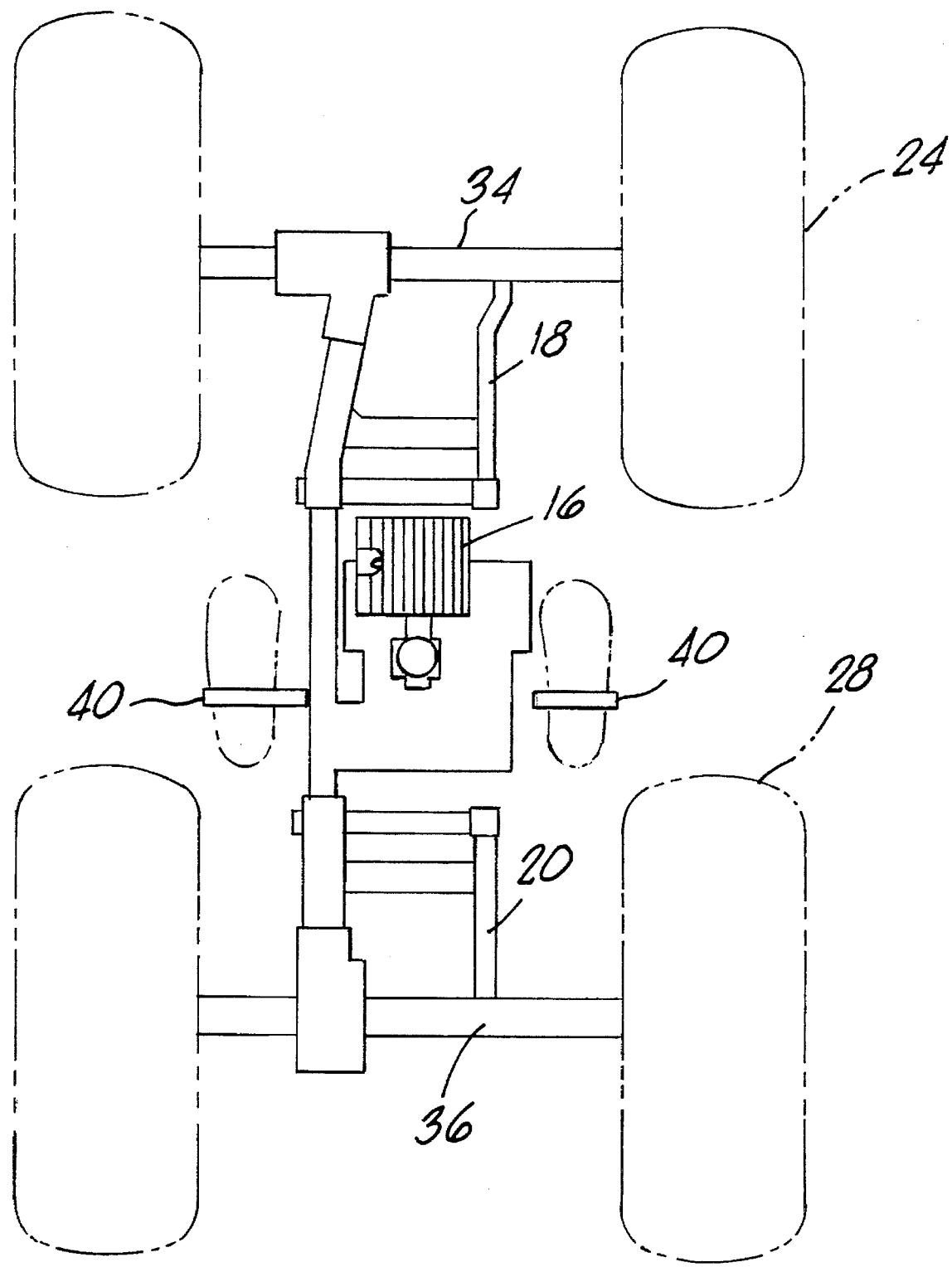
FIG. 3 is a schematic plan view illustrating the location of tires, the engine, footpegs and suspension systems.

Turning then to the relationship between components, the plan view of FIG. 3 illustrates the location of the footpegs 40 relative to the tires 24 and 28. The distal ends of the footpegs 40 are spaced from the vertical, longitudinally extending central plane which may be defined through the vehicle a shorter distance than the innermost portion of the tires, 24 or 28. The footprints indicated in phantom in FIG. 3 illustrate the arrangement with the footpegs 40 as shown such that the rider avoids interference with the tires. The footpegs 40 may be placed wherever appropriate without concern for interference between the tires and the rider. Similarly, the size of the tires may be increased where desired without interfering with the footpegs and the footspace for the rider. The arrangement of the footpegs is also shown to be at a vertical height above a horizontal plane roughly equal to that of the wheel axles 34 and 36. The frame 10 is shown to be no lower than the footpegs 40. Thus, obstacles clearing the axles 34 and 36 between the tires 24 and 28 are likely to clear the frame 10 and footpegs 40 as well. The footpegs are also located about halfway between a horizontal ground plane and the seat 14. This is believed to be an appropriate location for operation over irregular terrain. With large tires, the footpegs 40 are preferably raised to such an elevation to clear objects as described above as well.

Looking to the arrangement of the frame relative to the rear tires 28, a volume, indicated in phantom in FIG. 1 as 48 is defined beneath the frame 10. The volume 48 is considered to be a laterally extending cylinder having an axis positioned directly beneath the center of gravity of the vehicle. The diameter of the volume 48 is defined as being the distance between the lowermost part of the frame 10 beneath the center of gravity and the horizontal ground surface upon which the tires 24 and 28 rest. As can be seen from FIG. 1, the rear tires 28 intrude into the volume 48. In this instance, the footpegs 40 are also aligned in a plane extending vertically and laterally relative to the vehicle which contains the center of gravity.

The foregoing intrusion of the rear wheels 28 into the defined volume 48 enhances the ability of the vehicle to surmount obstacles when riding over rough terrain. Understanding that the center of gravity is located in a vertical and laterally extending plane which includes the axis of the defined volume 48, any obstacle over which the front tires 24 have rolled will be straddled between the front and rear tires. Until the obstacle reaches the center of gravity, the rear of the vehicle is heavier and traction will remain on the rear wheels. This is likely to occur even though the obstacle may be higher than the frame clearance. As the vehicle continues forward influenced by the traction of the rear wheels, the rear tires 28 will come into contact with the obstacle and engage them to lift the vehicle over the obstacle. Assuming a rounded obstacle, the rear tires 28 will encounter the obstacle before the center of gravity comes directly over the obstacle. Thus, the vehicle is unlikely to get hung up straddling such an obstacle.

The spacing between the front and rear tires 24 and 28, respectively, also impacts on the ability of the vehicle to surmount rough terrain. The closer the front and rear tires are, the more easily rough terrain is overcome. However, by placing the tires very close together, it becomes awkward for a rider to mount the vehicle. It is preferred that some space is provided between the front and rear wheels so that the rider can pass between these wheels to gain access to the rider position on the vehicle. Consequently, it has been found that the space between the closest points of the tires 24 and 28 as measured in a longitudinal direction of the vehicle is preferably about equal to the radius of the tires. This provides substantial all terrain capability and at the same time provides reasonable access to the driving position of the vehicle.

Looking at the vehicle in plan, as best seen in FIG. 3, the centers of the tires and wheels define points on a square. Thus, the track of the front wheels 24 and of the rear wheels 28 are shown to be substantially the same distance. Furthermore, the distance between the centerlines of the axles is essentially the same as the distances between the centers of either of the front or rear wheels by configuring the vehicle in such a way as to create the square arrangement between wheel centers. As the tread is wider than conventional vehicles relative to the wheel base, some additional stability, rider comfort and equality of balance is achieved. The moment arms in both pitch and roll about the lateral and longitudinal axes of the vehicle, respectively, are substantially equal. As a result, a greater feel of balance and equal forces both longitudinally and laterally can be experienced. Further, operation in water or mud tends to be improved.

In conjunction with the arrangement of the tires, frame and footpegs, the engine is preferably placed centrally in the vehicle. The engine in the preferred embodiment is illustrated to be positioned midway between the front and rear wheels as taken in a longitudinal direction. The engine is also preferably centered laterally in the vehicle to increase the forces and moments retaining the vehicle in an upright position. Maintaining the engine 16 at a low location also enhances this feature. The engine is shown to be below a plane including the top points on all four tires. With the low engine position, it is preferable that ports such as the exhaust pipe outlet and the air intake be located above that same plane to reduce the possibility of contamination.

The swing arms 18 and 20 are shown to be pivotally mounted to the frame 10. This allows the swing arms to move up and down in an angular motion to provide suspension to the wheels 22 and 26 which are rotatably mounted to the distal ends of the suspension assemblies 18 and 20. The effective length of the swing arm assemblies, principally the distance between the pivot axes of the swing arms and the axes for the wheels, is shown to be shorter than the radius of each tire 24 and 28. This places the pivot axes of the swing arms 18 and 20 between the front and rear tires 24 and 28, respectively. Consequently, the wheel base may be shortened without modification to the frame 10 over conventional, long swing arms. Further, the swing arm assemblies are better protected as they are surrounded by tires.

Thus, improved arrangements between components on a four-wheel all terrain vehicle have been shown to improve the all terrain capabilities of the vehicle and its other design considerations. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An all terrain vehicle comprising a center of gravity;

a frame including a front, a rear, two opposite sides and straddle seating;

front wheels each having a first center and a first inner extent and supporting said front of said frame and mutually spaced on said opposite sides thereof;

rear wheels each having a second center and a second inner extent and supporting said rear of said frame and mutually spaced on said opposite sides thereof;

an engine carried longitudinally between said front and said rear wheels by said frame;

footpegs fixed to said frame, having distal ends, associated with said straddle seating and positioned to opposite sides, respectively, of said frame lower than said center of gravity of the vehicle, said distal ends of said footpegs being inwardly of said inner extent of said front and rear wheels; and tires on each of said front and rear wheels and extending to a lowermost extent, said tires on said rear wheels being of a diameter and location relative to said frame such that said tires on said rear wheels extend into a cylindrical space having an axis extending laterally of the vehicle, substantially aligned longitudinally with and below said center of gravity of the Vehicle and said cylindrical space having a diameter equal to the distance between the undermost side of said frame where aligned substantially longitudinally with said center of gravity of the vehicle and a level surface containing said lowermost extent of said tires.

2. The all terrain vehicle of claim 1 wherein said tires on said front wheels and said tires on said rear wheels are spaced apart on either side of the vehicle substantially the radius of a said rear tire.

3. The vehicle of claim 1 wherein said centers of said wheels define substantially a square in plan.

4. The vehicle of claim 1 wherein said footpegs are substantially aligned longitudinally with the center of gravity of the vehicle.

5. The vehicle of claim 1 further comprising swing arms pivotally mounted to said frame and rotatably mounting said rear wheels, said swing arms having an effective length less than the radius of each of said tires on said rear wheels.

6. An all terrain vehicle comprising a center of gravity;

a frame including a front, a rear, two opposite sides and straddle seating having a driver seat with an upper surface;

front wheels each having a first center and a first inner extent and supporting said front of said frame and mutually spaced on said opposite sides thereof;

rear wheels each having a second center and a second inner extent and supporting said rear of said frame and mutually spaced on said opposite sides thereof;

an engine carried longitudinally between said front and said rear wheels by said frame at substantially the mid point longitudinally between said front and said rear wheels;

footpegs fixed to said frame and extending to distal ends laterally outwardly of said frame, said footpegs being associated with said straddle seating and positioned to opposite sides, respectively, of said frame below and substantially aligned longitudinally of the vehicle with said center of gravity of the vehicle, said distal ends of said footpegs being inwardly of said inner extent of said front and rear wheels;

tires on each of said front and rear wheels each extending to a lowermost extent, said tires on said rear wheels being of a diameter and location relative to said frame such that said tires on said rear wheels extend into a cylindrical space having an axis extending laterally of the vehicle substantially aligned longitudinally with and below said center of gravity of the vehicle and said space having a diameter equal to the distance between the undermost side of said frame where aligned substantially longitudinally with said center of gravity of the vehicle and a level surface containing said lowermost extent of said tires, said front and rear tires being mounted such that the longitudinal spacing between said front and rear tires is substantially equal to the radius of said rear tires, said first and second centers of said front and rear wheels being arranged to form substantially a square in plan, said footpegs being located midway between said said upper surface of said driver seat and a level surface containing said lowermost extent of said tires;

swing arms pivotally mounted to said frame and rotatably mounting said rear wheels, said swing arms having an effective length less than the radius of each of said tires on said rear wheels.

* * * * *